(12) United States Patent
Leach (10) Patent No.: US 8,751,788 B2
(45) Date of Patent: Jun. 10, 2014

(54) PAYMENT ENCRYPTION ACCELERATOR

(75) Inventor: Nathan P. Leach, Tomball, TX (US)

(73) Assignee: Paymetric, Inc., Alpharetta, GA (US)

( * ) Notice: Subject to any disclaimer, the term of this patent is extended or adjusted under 35 U.S.C. 154(b) by 684 days.

(21) Appl. No.: 12/482,231

(22) Filed: Jun. 10, 2009

(65) Prior Publication Data

US 2010/0070754 A1    Mar. 18, 2010

Related U.S. Application Data (60) Provisional application No. 61/060,282, filed on Jun. 10, 2008.

(51) Int. Cl.
*H04L 9/00* (2006.01)
(52) U.S. Cl.
USPC ........... 713/152; 713/161; 713/182; 713/193; 726/9; 726/12; 726/27
(58) Field of Classification Search
USPC .......................... 713/151/152/153; 726/4/9, 6
See application file for complete search history.

(56) References Cited

U.S. PATENT DOCUMENTS

| | | | | |
|---|---|---|---|---|
| 6,314,517 | B1 * | 11/2001 | Moses et al. | 713/156 |
| 2003/0014629 | A1 * | 1/2003 | Zuccherato | 713/156 |
| 2003/0061170 | A1 * | 3/2003 | Uzo | 705/64 |
| 2003/0191970 | A1 * | 10/2003 | Devine et al. | 713/201 |
| 2004/0098595 | A1 * | 5/2004 | Aupperle et al. | 713/185 |
| 2005/0132222 | A1 * | 6/2005 | Petrovic | 713/201 |
| 2006/0235803 | A1 * | 10/2006 | Romney | 705/65 |
| 2008/0127320 | A1 * | 5/2008 | De Lutiis et al. | 726/9 |
| 2008/0263645 | A1 * | 10/2008 | Renter et al. | 726/6 |

OTHER PUBLICATIONS http://www.firstdata.com/downloads/thought-leadership/fd_encrypt_token_pci_whitepaper.pdf "Data Encryption and Tokenization"—Sep. 2009, First Data.*
http://www.firstdata.com/downloads/thought-leadership/EMV-Encrypt-Tokenization-WP.PDF "EMV and Ecnryption + Tokenization"—2012 First Data.*

* cited by examiner

*Primary Examiner* — Randy Scott
(74) *Attorney, Agent, or Firm* — Morris, Manning & Martin, LLP; Daniel E. Sineway, Esq.

(57) ABSTRACT

Embodiments of the invention provide a system for encrypting web session data which may include a session management module adapted to receive data from a web application module and provide a token that represents the data in encrypted form to the web application, wherein the web application is adapted to use the token to represent the data. The system may also include a tokenizer module communicably coupled to the session management module, wherein the tokenizer module is adapted to receive the data and generate the token. Further, the system may include a database communicably coupled to the session management module, wherein the database is adapted to receive the token and the data, associate the token with the data, and store the token and the data.

12 Claims, 6 Drawing Sheets

PAYMENT ENCRYPTION ACCELERATOR

This application claims the benefit of the filing date of U.S. Provisional Patent Application Ser. No. 61/060,282, which was filed on Jun. 10, 2008. This priority application is hereby incorporated by reference in its entirety into the present application, to the extent the priority application is not inconsistent with the present application.

BACKGROUND OF THE INVENTION

Visa's PCI-DSS gives very specific guidelines about how card data is to be handled if it is to be stored in an "at-rest" state. PCI-DSS compliance in an enterprise computing landscape can be difficult due to the requirements around encryption. The XiSecure product was created to address these difficulties, and it does so by creating a centralized location where data can be stored in a way that complies with PCI-DSS. XiSecure also potentially removes PCI-DSS requirements from some systems since sensitive data is replaced with a token that can be passed between the various enterprise systems.

New integration methodologies such as the "Enterprise Service Bus" or ESB are a new challenge to overcoming the PCI-DSS requirements on systems. Using an ESB, messages are exchanged between services by using a database to persist messages on the "bus". This generally means that messages incoming from external sources, such as a web-based e-commerce system, are persisted directly to disk upon entering the service bus. This persisted data often contains sensitive information such as credit card numbers; sensitive data such as card numbers should never be persisted to disk unless they are first encrypted according to the PCI-DSS.

The merits of interpreting this "no persistence unless encrypted" literally can be debated. While it does seem obvious that persisting unencrypted data to the database should be avoided, the ESB uses the database more as an inter-process communication conduit rather than a place to store and retrieve organized data. Certainly, if interpreted literally, modern operating systems that implement virtual memory (where a running program's memory can be written to disk by the operating system without the program's knowledge) would be impossible to comply with the PCI-DSS. Regardless of lack of technical specifics that is typical of the PCI-DSS, the interpretation tends to be strict when involving the ESB due to the involvement of writing data into a database.

Therefore, there is a need for a Secure Web Encryption Accelerator (XWEA) that is designed with this strict interpretation of the storage of sensitive data in the database.

SUMMARY OF THE INVENTION

Embodiments of the invention may provide a new XWEA that is configured to allow data to be encrypted from the web browser before sensitive data is received by a back-end system. An exemplary embodiment of the invention encompasses a computer-readable medium containing instructions which, when executed, by a processor cause a computer to perform a method, the method including receiving data at a session management system from a web application, wherein the session management system is communicably coupled to a database. The method may also include generating a token that represents the data in encrypted form at a tokenizing system communicably coupled to the session management system, and associating the token with the data. Further, the method may include storing the token and the data in the database, and providing the token to the web application for use in representing the data.

In another embodiment, the invention encompasses a system for encrypting web session data which may include a session management module adapted to receive data from a web application module and provide a token that represents the data in encrypted form to the web application, wherein the web application is adapted to use the token to represent the data. The system may also include a tokenizer module communicably coupled to the session management module, wherein the tokenizer module is adapted to receive the data and generate the token. Further, the system may include a database communicably coupled to the session management module, wherein the database is adapted to receive the token and the data, associate the token with the data, and store the token and the data.

DETAILED DESCRIPTION

The present disclosure relates generally to cryptography management in an enterprise software environment. More specifically, the present disclosure relates to a system for allowing a centralized data management service for encrypted data.

An embodiment of a crypto system in accordance with the present disclosure performs centralized data management and various cryptographic operations for one or more applications. The crypto system handles various cryptography functions for multiple applications, including, without limitation, encryption, mass encryption, decryption and data rotation. Further, the encryption system performs cryptography functions using its own resources, thereby reducing the burden on application resources. The crypto system includes a data storage system that enables storage of data. A token mechanism allows the one or more applications to submit data to the crypto system and request data from the crypto system.

Further, the crypto system may support performance balancing and load balancing features to support high-transaction and high-availability environments. The crypto system may also be able to perform operations such as key status metrics, data usage, purging, reporting and logging.

In describing selected embodiments, various objects or components may be implemented as computing modules. These modules may be general-purpose, or they may have dedicated functions such as memory management, program flow, instruction processing, object storage, etc. The modules can be implemented in any way known in the art. For example, in one embodiment a module is implemented in a hardware circuit including custom VLSI circuits or gate arrays, off-the-shelf semiconductors such as logic chips, transistors, or other discrete components. One or more of the modules may also be implemented in programmable hardware devices such as field programmable gate arrays, programmable array logic, programmable logic devices or the like.

In an exemplary embodiment, one or more of the modules are implemented in software for execution by various types of processors. An identified module of executable code may, for instance, may include one or more physical or logical blocks of computer instructions that may, for instance, be organized as an object, procedure, or function. Further, the executables of an identified module need not be physically located together, but may include disparate instructions stored in different locations that, when joined logically together, include the module and achieve the stated purpose for the module. A "module" of executable code could be a single instruction, or many instructions, and may be distributed over several different code segments, among different programs, and across several memory devices. Similarly, operational data may be identified and illustrated in association with one or more modules, and may be embodied in any suitable form and organized within any suitable type of data structure. The operational data may be collected as a single data set, or may be distributed over different locations including over different storage devices, and may exist, at least partially, as electronic signals on a system or network.

In some embodiments, higher-level components may be used as modules. For example, one module may include an entire computer acting as a network node. Another module may include an off-the-shelf or custom program, such as a database management system. These higher-level modules may be decomposable into smaller hardware or software modules corresponding to different parts of a software program and identifiable chips (such as memory chips, ASICs, or a CPU) within a computer.

One type of module is a "network." A network module defines a communications path between endpoints and may include an arbitrary amount of intermediate modules. A network module may encompass various pieces of hardware, such as cables, routers, and modems, as well the software necessary to use that hardware. Another network module may encompass system calls or device-specific mechanisms such as shared memory, pipes, or system messaging services. A third network module may use calling conventions within a computing module, such as a computer language or execution environment. Information transmitted using the network module may be carried upon an underlying protocol, such as HTTP, BXXP, or SMTP, or it may define its own transport over TCP/IP, IPX/SPX, Token Ring, ATM, etc. To assure proper transmission, both the underlying protocol as well as the format protocol may split the information into separate pieces, wrap the information in an envelope, or both. Further, a network module may transform the data through the use of one or more computing modules.

Figure 1:
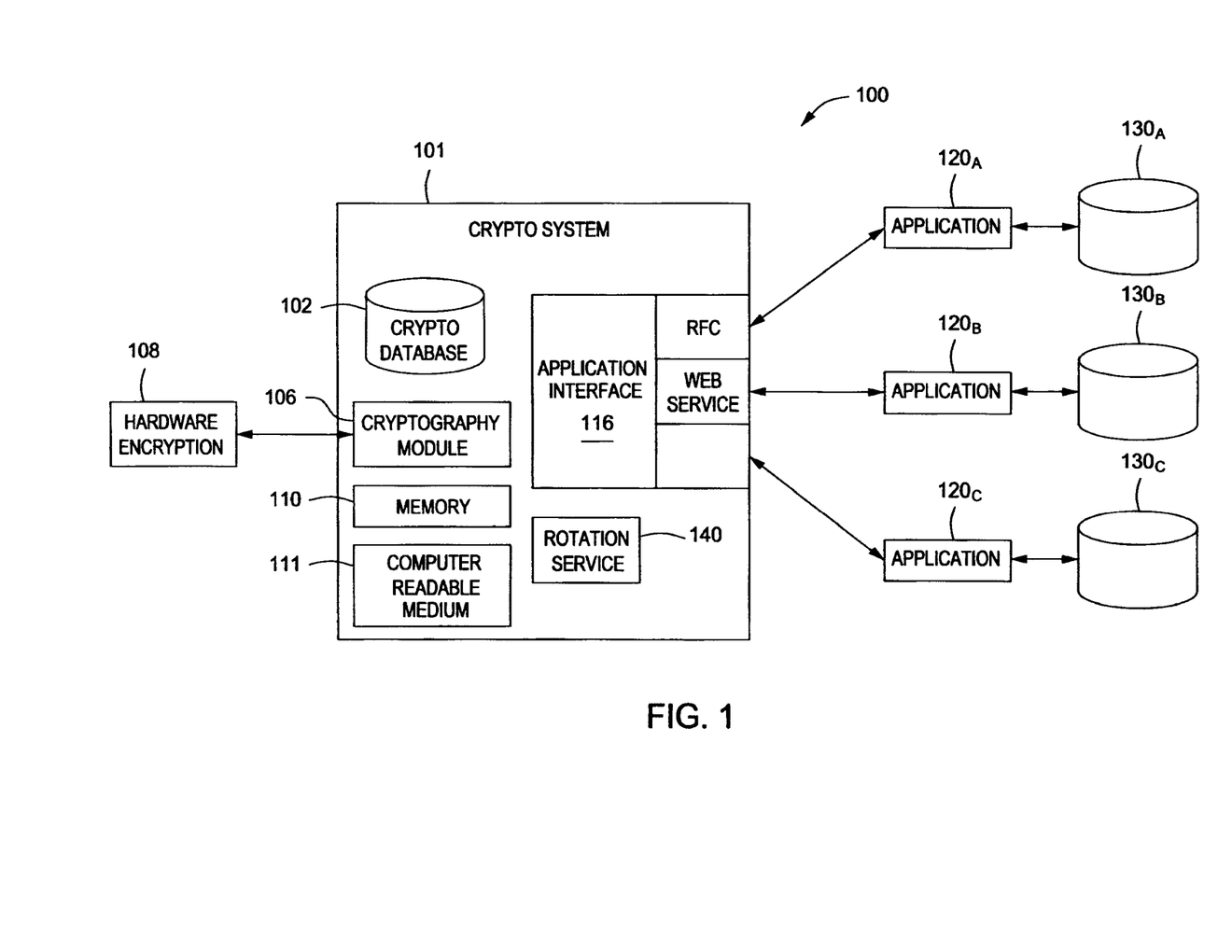
FIG. 1 shows schematically an illustrative embodiment of an enterprise software environment including a crypto system according to an embodiment of the present disclosure.

Referring to FIG. 1, illustrated is an enterprise software environment 100 including an exemplary embodiment of a crypto system 101. The crypto system 101 includes a crypto database 102, a cryptography module 106, memory 110 and a computer readable medium 111, one or more application interfaces 116, and a data rotation service 140. In one embodiment, the crypto system 101 is communicably coupled to encryption hardware 108, such as a network-connected hardware security module (HSM). Further, one or more applications 120A-C may be communicably coupled to the crypto system 101. Each application 120A-C may be communicably coupled to an application database 130A-C.

The crypto database 102 may include application data that has been encrypted by the crypto module 106 with an active encryption key. The crypto database 102 might store a reference to more than one active encryption key at any one time. For example, an active encryption key may be assigned to one or more applications. Further, active encryption keys might be rotated periodically. When an active encryption key is rotated, the data may also be rotated. The process of rotating encryption keys and rotating data is discussed in more detail below with respect to FIG. 6. The crypto system 101 may define one or more data rotation and archival policies for each active encryption key.

One or more characteristics may be associated with the application data. For example, the application data may include such characteristics as a creation date (when the data was first created), and a "reference" date (when the data was last referenced).

In one embodiment, the crypto database 102 is a MICROSOFT SQL SERVER implementation operating on a MICROSOFT WINDOWS-based operating system. In a second embodiment, the crypto database 102 is an ORACLE database operating on a MICROSOFT WINDOWS-based operating system. In a third embodiment, the crypto database 102 is a PostgreSQL database operating on a LINUX-based operating system. In a fourth embodiment, the crypto database 102 operates on a UNIX-based operating system. It should be understood that the foregoing examples are merely embodiments and that the crypto database 102 may be any database implementation operating on any operating system.

In an exemplary embodiment, the cryptography module 106 takes one or more inputs, which may include instructions, a key, and data in encrypted or unencrypted form. The cryptography module 106 outputs data in encrypted or unencrypted form. A function of the cryptography module 106 is to perform cryptography operations including, without limitation, encryption and decryption of data. In one embodiment, the cryptography module 106 includes implementations of one or more cryptography algorithms. For example, in a first embodiment, the cryptography module 106 includes an implementation of a PCI DSS-compliant technology based on the National Institute of Standards and Technology (NIST) Advanced Encryption Standard (AES) cryptography technology. In a second embodiment, the cryptography module 106 includes an implementation of RSA encryption technology, such as the RC4 algorithm. In a third embodiment, the cryptography module 106 includes an implementation of MICROSOFT cryptography technology, such as the MICROSOFT Crypto API or any other MICROSOFT Cryptographic Service Provider (CSP). A fourth embodiment of the cryptography module 106 includes implementations of protocols that may be used to communicate with encryption hardware 108. For example, the cryptography module 106 might include an implementation of the RSA PKCS 11 API. The foregoing are merely examples of cryptography technology that may be used in embodiments of the present disclosure and are not meant to be limiting.

In one embodiment, upon receiving input, the cryptography module 106 performs the requested operations on the data using the key in accordance with the instructions. For example, if an instruction includes encryption instructions, then the cryptography module 106 encrypts the data with the key. The cryptography module 106 may run on one computer, or it may run on multiple computers for purposes of load balancing and failover.

The crypto system 101 is communicably coupled to one or more applications 120A-C. An application interface 116 enables communication between an application 120A-C and the crypto system 101. Possible application interfaces 116 include, without limitation, Remote Procedure Calls (RPC) and web services. For example, in one embodiment, the RPC application interface is the Remote Function Call (RFC), which is an application interface used by SAP systems. Applications 120A-C may submit data requests to the crypto system 101 via an application interface 116.

Three applications 120A-C are depicted in FIG. 1, however any number of applications 120A-C are possible. The applications 120A-C may be high-availability systems that require minimal down-time. Each application 120A-C may be communicably coupled to one or more application databases 130A-C. In one embodiment, the application databases 130A-C are MICROSOFT SQL SERVER implementations operating on a MICROSOFT WINDOWS 2003 SERVER operating system. In a second embodiment, the application databases 130A-C are ORACLE databases operating on a MICROSOFT WINDOWS 2003 SERVER operating system. In a third embodiment, the application databases 130A-C are PostgreSQL databases operating on a LINUX-based operating system. In a fourth embodiment, the application databases 130A-C operate on a UNIX operating system. It should be understood that the application databases 130A-C may be any database implementation operating on any operating system, and the foregoing embodiments are not meant to be limiting.

In an embodiment, the applications 120A-C and the application databases 130A-C do not locally store certain application data. For example, sensitive data, such as credit card information or any kind of personally identifiable information (PII), might not be stored local to the applications 120A-C or the application databases 130A-C. In one embodiment, instead of storing certain application data, the applications 120A-C and the application databases 130A-C only store tokens. A token is a data item generated by the crypto system 101 and returned to applications 120A-C in response to a request to store data. Applications 120A-C store the token and later use the token to request data.

In one embodiment, a token is a text string that is 25 characters in length. A sample token in accordance with such an embodiment is as follows:

-VVVV-SSSS-NNNNNNNNNNNNNC

In one embodiment utilizing the above sample token, indices 0, 5, and 10 are the dash "-" character. The indices 1 through 4 (represented by the placeholder "V") represent a base-16 encoded integer value that is a version indicator used to determine the code path to take when evaluating the token during decryption requests. If the length of the unencrypted string is between 1 and 4 characters, then indices 6 through 9 (represented by the placeholder "S") are blank spaces. Otherwise, if the length of the unencrypted string is more than 4 characters, then the indices 6 through 9 represent the last four characters of the unencrypted string. In one embodiment, the unencrypted string is a credit-card number, and indices 6-9 represent the last four digits of the credit-card number. Zero length strings may not be encrypted.

Indices 11 through 23 (represented by the placeholder "N") are a base-32 representation of a 64-bit unsigned number. In one embodiment, indices 11-23 represent a unique identifier that is associated with the encrypted string in the database. That is, taken together, the indices 11 through 23 may serve as a primary key that the database can use to locate the record that includes the encrypted string. In one embodiment, each index 12 through 23 is a base 32 value. Finally, index 24 is a check digit that is calculated by adding the values of the base-32 characters and representing it as a modulo 32 number.

The token embodiment set forth above may be stored in plain-text data fields in applications 120A-C and application databases 130A-C. Further, the token embodiment above may also be represented using text-based markup languages, such as XML. Encoding the token using a text-based markup language facilitates transport of the token among disparate platforms.

Figure 2A:
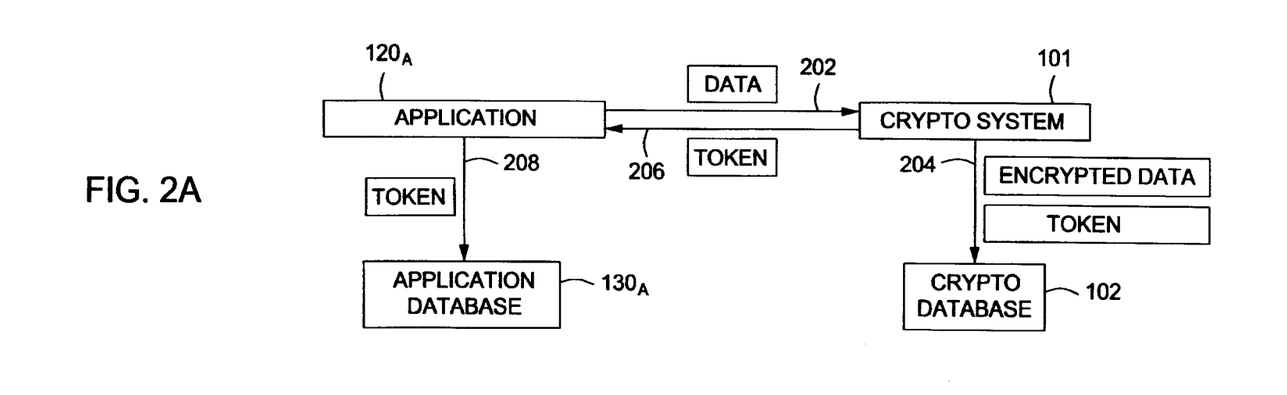
FIG. 2A shows schematically an illustrative embodiment of how an application communicably coupled to a crypto system of the present disclosure requests data encryption services and receives a token.

Referring now to FIG. 2A, illustrated is an embodiment of a token-based method for an application 120A to encrypt application data using a crypto system 101. Arrow 202 shows the application 120A submitting data to the crypto system 101 via the application interface 116. The crypto system 101 encrypts the data using the cryptography module 106, and as illustrated by arrow 204, the crypto system 101 submits the encrypted data to the crypto database 102 for storage. Crypto system 101 generates a token and returns the token to the application 120A in a step 206. After receiving the token, the application 120A in a step 208 stores the token in the application database 130A.

Figure 2B:
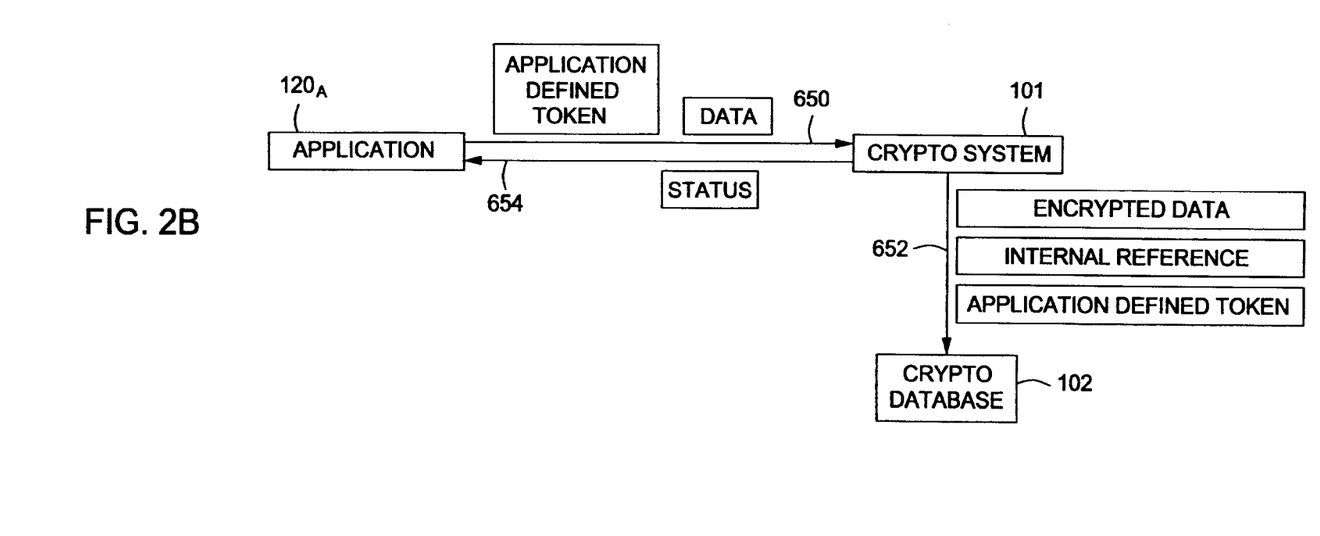
FIG. 2B show schematically an illustrative embodiment of how an application communicably coupled to a crypto system of the present disclosure requests data encryption services and provides an application-defined token to the crypto system.

Referring now to FIG. 2B, illustrated is an embodiment of an token-based method for an application 120A to encrypt application data using the crypto system 101, wherein the application 120A defines the token. As shown by arrow 650, in one embodiment, the application 120A supplies an application-defined token to the crypto system 101 at the time the application 120A submits data to the crypto system 101. For example, in one embodiment, the application defined token is the social security number of a credit card holder. The crypto system 101 encrypts the data using the cryptography module 106 and generates an internal reference that is associated with the application-defined token. As illustrated by arrow 652, the crypto system 101 submits the encrypted data, the application-defined token, and the internal reference to the crypto database 102 for storage. The crypto system 101 then returns a status response to the application 120A as shown by arrow 654.

In certain situations, using an application-defined token, as described with respect to FIG. 2B, may be more appropriate than using a token defined by the crypto system 101, as described with respect to FIG. 2A. For example, an application 120A-C may be unable to store a token generated by the crypto system 101. This may occur if the token generated by the crypto system 101 is too large for the fields defined in a table of an application database 130A-C. Another scenario where an application-defined token may be more appropriate than a crypto system-defined 101 token is the situation where an application database 130A-C is part of a legacy system that does not support adding extra columns to a table of the application database 130A-C. In one embodiment, more than one application-defined token may be associated with an encrypted value. For example, in one embodiment, the encrypted value may be a credit card number, and one application-defined token may be the social security number of the credit card holder, and a second application-defined token may be an employee identification number of the credit card holder. Applications 120A-C may then submit either the social security number of the employee identification number as a token to the retrieve the encrypted information from the crypto system 101, as explained in more detail below.

Figure 3:
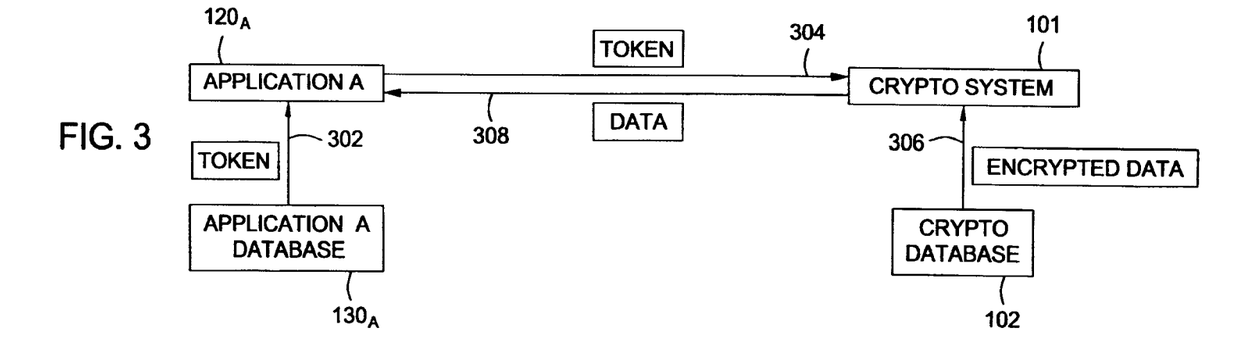
FIG. 3 shows schematically an illustrative embodiment of how an application communicably coupled to an embodiment of a crypto system of the present disclosure may request decryption services by using a token.

Referring now to FIG. 3, illustrated is an embodiment of a token-based method for an application 120A to retrieve application data stored on a crypto database 102. Arrow 302 represents the step of the application 120A retrieving a token from the application database 130A. In another embodiment, instead of retrieving a token from the application database 130A, the application 120A generates an application-defined token. The application 120A submits the token to the crypto system 101 via the application interface 116 as shown by arrow 304. Then, as exemplified by arrow 306, the crypto system 101 retrieves the encrypted data corresponding to the token from the crypto database 102. The crypto system 101 decrypts the encrypted data using the cryptography module 106. As illustrated by arrow 308, the crypto system 101 then returns the unencrypted data to the application 120A.

Figure 4:
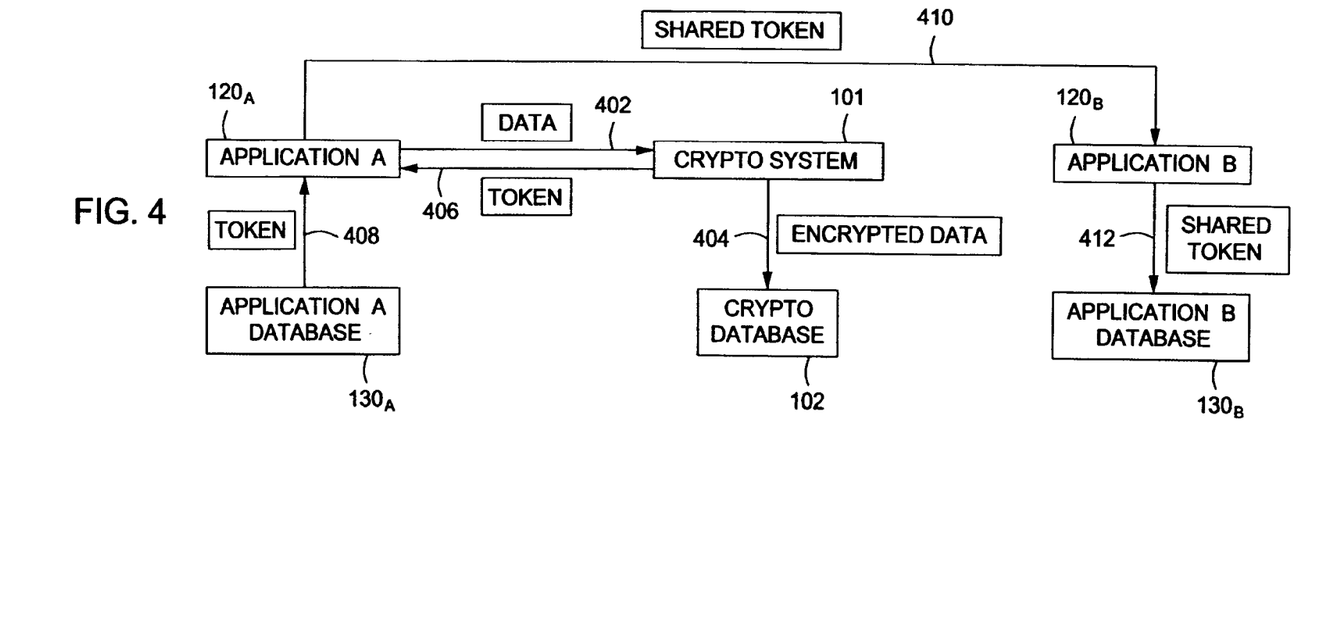
FIG. 4 shows schematically an illustrative embodiment of how an application communicably coupled to an embodiment of a crypto system of the present disclosure may encrypt data and pass the resulting token to another application.

Referring now to FIG. 4, illustrated is an embodiment of a token-based method for an application 120A to encrypt application data using the crypto system 101 and share the encrypted data with another application 120B. The embodiment illustrated in FIG. 4 is similar to the embodiment illustrated in FIG. 2. Arrows 402, 404, 406, and 408 in FIG. 4 correspond to the actions represented by arrows 202, 204, 206 and 208 respectively. In addition to the steps 202, 204, 206 and 208 described in FIG. 2, the embodiment of FIG. 4 further includes a step 410 wherein the application 120A shares the token received from the crypto system 101 with the application 120B. After the application 120B receives the shared token from the application 120A, the application 120B stores the token in the application database 130B, as shown by arrow 412.

Figure 5:
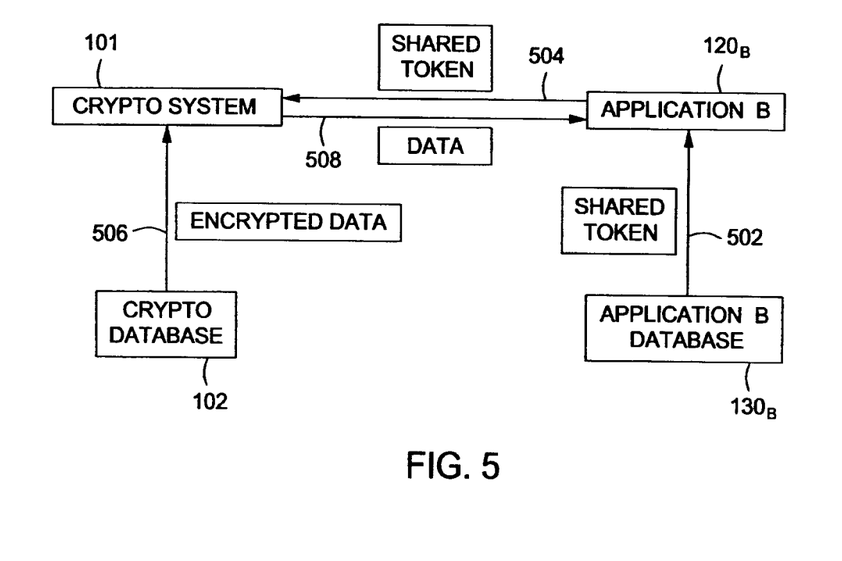
FIG. 5 shows schematically an illustrative embodiment of how an application communicably coupled to an embodiment of a crypto system of the present disclosure may request the decrypted value of data by using a shared token.

Referring now to FIG. 5, illustrated is an embodiment of a token-based method for an application 120B to retrieve application data stored on a crypto system 101 using a shared token. The embodiment of FIG. 5 is similar to the embodiment illustrated in FIG. 3, except that the application 120B is substituted for the application 120A, and the application database 130B is substituted for the application database 130A. Accordingly, arrow 502 represents the application 120B retrieving a shared token from the application database 130A. The application 120B submits the shared token to the crypto system 101 via the application interface 116 as shown by arrow 504. Then, as exemplified by arrow 506, the crypto system 101 retrieves the encrypted data corresponding to the shared token. The crypto system 101 decrypts the encrypted data using the cryptography module 106. As illustrated by arrow 508, the crypto system 101 then returns the unencrypted data to the application 120B.

In an exemplary embodiment, the crypto system 101 periodically performs a key rotation operation. In one embodiment, keys are stored only in the cryptography module 106 and references to keys are stored in the crypto database 102. A key rotation operation may include replacing the current active encryption key with a new active encryption key. In an embodiment, when the crypto system 101 performs a key rotation, the crypto system 101 also performs a data rotation operation in response to a key rotation. In one embodiment, the data rotation operation occurs at fixed intervals. For example, the crypto system 101 might be configured to perform the data rotation operation during low-volume periods. In a second embodiment, the crypto system 101 is configured to perform the data rotation operation at variable intervals. In a third embodiment, a user of the crypto system 101 initiates a data rotation operation. For example, a user might issue a data rotation operation command to the crypto system 101 from a terminal that is communicably coupled to the crypto system 101.

According to one embodiment, the data rotation service 140 monitors a crypto system 101 and performs data rotation operations upon the occurrence of a key rotation operation. In one embodiment, the data rotation service 140 executes on a single computer that is communicably coupled to the crypto database 102. in a second embodiment, separate instances of the data rotation service 140 operate concurrently on more than one system, thereby allowing clusters of systems to perform operations on partitions of a total data set.

Data rotation may include decrypting data that was encrypted with a previous active encryption key ("stale" data) and encrypting the decrypted data with the current active encryption key to produce "fresh" data. Thus, data rotation ensures that the data stored in the crypto database 102 is always fresh, i.e., encrypted with the then-current active encryption key. The data rotation service 140 utilizes the cryptography module 106 to decrypt and encrypt data.

Multiple references to decryption keys may be stored in the crypto database 102, the memory 110, or the computer readable medium 111. For example, the crypto database 102, the memory 110, or the computer readable medium 111 might include references to decryption keys that can decrypt stale data. Storing references to decryption keys enables the crypto system 101 to continue processing application 120A-C requests for data even if data rotation is not yet complete. For example, at some point during a data rotation, the encrypted data stored on the crypto database 102 may be in a state where one or more partitions include fresh data, but the remainder of the partitions include stale data. It is also possible that a partition may contain a combination of stale data and fresh data. Because the crypto system 101 has access to previous active encryption keys and the current active encryption key, the crypto system 101 can decrypt both stale data and fresh data. Thus, the crypto system 101 can continue to respond to the applications' 120A-C requests for data even if data rotation is not complete.

Figure 6:
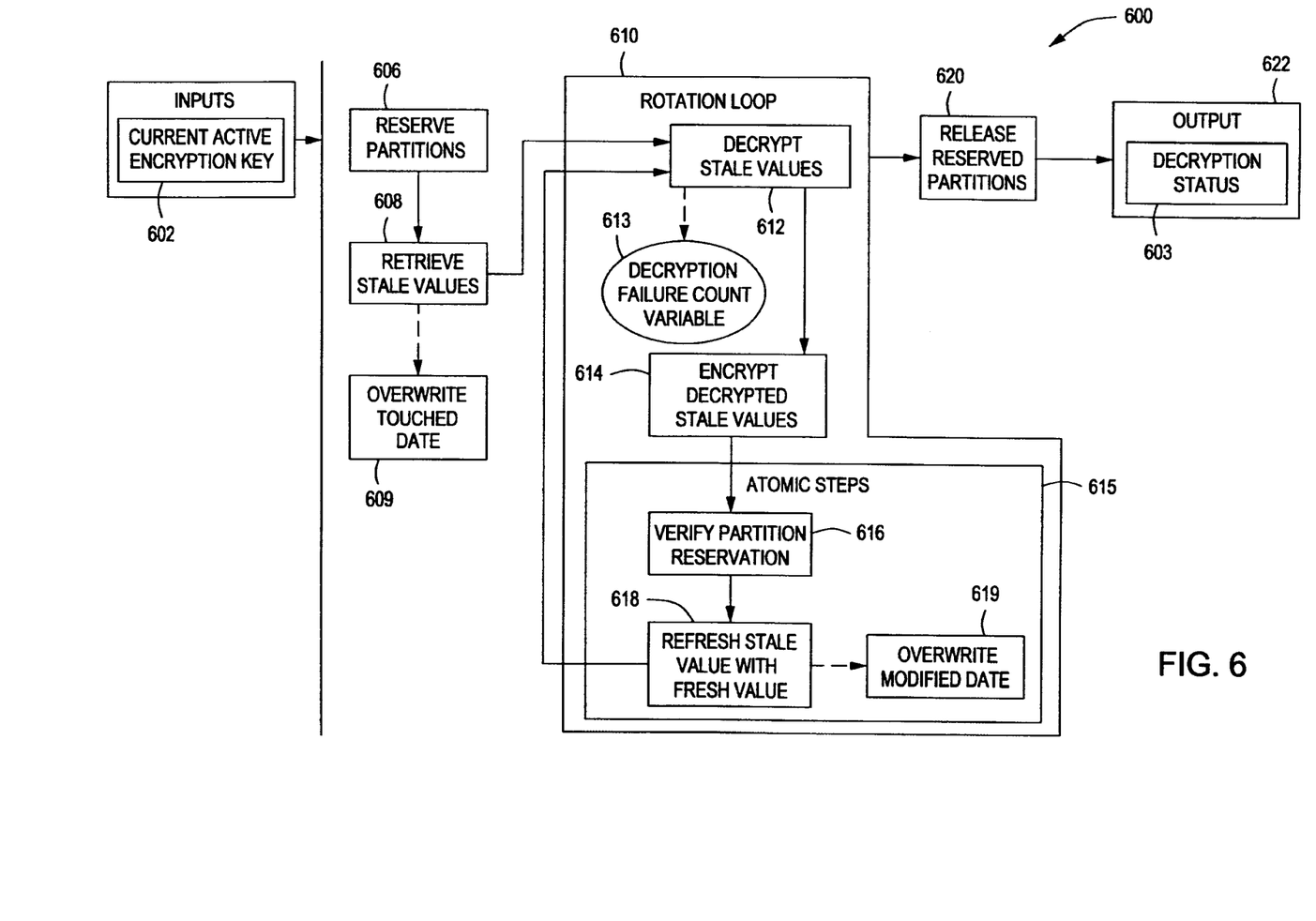
FIG. 6 shows schematically an illustrative embodiment of an algorithm implementing a rotation service according to the present disclosure.

Referring now to FIG. 6, illustrated is a flowchart diagramming an embodiment of an algorithm 600 implementing the data rotation service 140. The algorithm 600 takes in one or more inputs, which may include a reference to a current active encryption key 602, and outputs a decryption status 603. A function of the algorithm 600 is to rotate data stored in the crypto database 102.

In a reservation step 606, the algorithm 600 reserves a partition containing stale data stored in the crypto database 102. In an embodiment, each partition has an associated partition reservation time. The partition reservation time reflects when the partition was last reserved. When the algorithm 600 reserves a partition, the algorithm 600 also updates the partition reservation time. In one embodiment, the algorithm 600 may reserve partitions that are currently reserved by operations that have timed out.

At a retrieval step 608, the algorithm 600 retrieves all stale values in the reserved partition from the crypto database 102. The algorithm 600 stores the stale values in a data structure. One embodiment uses a one-dimensional array as the data structure. During the retrieval step 608, the algorithm 600 does not modify the reference date of the stale values when they are read. In one embodiment, if the crypto database 102 automatically updates the reference date of the stale values when they are read in the data retrieval step 608, then the algorithm 600 notes the original reference date of the stale value before reading the stale value, and after reading the stale value, the algorithm 600 updates the reference date to reflect the original read date.

Then, the algorithm 600 performs a data rotation loop 610. In one embodiment, the data rotation loop 610 includes a decryption step 612, an encryption step 614, and one or more atomic steps 615. One function of the data rotation loop 610 is to decrypt stale values, encrypt such stale values with the current active encryption key to produce fresh values, and replace stale values in the crypto database 102 with fresh values.

At the decryption step 612, beginning with the first stale value in the array, the algorithm 600 decrypts the stale value with the corresponding decryption key. It is possible that an attempt to decrypt a stale value will fail. For example, one reason for decryption failure may be that the corresponding decryption key is not available on the crypto system 101. Another reason for decryption failure may be that the stale value is corrupt. Each time the decryption fails for any reason, the decryption count failure variable 613 is incremented by one.

Then, at an encryption step 614, the algorithm 600 encrypts the decrypted stale value with the current active encryption key 604 to produce a fresh value.

In an exemplary embodiment, the atomic steps 615 include a verifying step 616 and a refresh step 618. The atomic steps 615 must all complete successfully, otherwise any effects of each atomic step must be undone. At the verifying step 616, the algorithm 600 verifies that the partition is still reserved and updates the partition reservation time. If the partition is not still reserved, then the atomic steps 615 fail. Then in a refresh step 618, the algorithm 600 overwrites the stale value in the crypto database 102 with the corresponding fresh value. If overwriting the stale value fails, then the atomic steps 615 fail.

The algorithm 600 does not modify the reference date of the overwritten data during the refresh step 618. In one embodiment, if the crypto database 102 automatically updates the reference date of the overwritten data, then at step 619, the algorithm 600 notes the original modification date of the stale value before overwriting the stale value, and after overwriting the stale value, the algorithm 600 modifies the reference date of the fresh value to reflect the original modification date.

Then at a release step 620, the algorithm 600 releases the reserved partition. Finally at an output step 622, the algorithm 600 outputs the decryption status 603, which may include a decryption failure count 613, and resets the decryption count failure variable 613 to zero. In one embodiment, the algorithm 600 repeats until all stale data in each partition has been processed.

It should be understood that the above algorithm 600 is merely one embodiment of the present disclosure. Accordingly, other implementations using different data structures and modules may be used. For example, in one embodiment of the algorithm 600, only a portion of the stale values in a partition are retrieved in the data retrieval step 608. Accordingly, in such an embodiment, the algorithm 600 repeats, each time processing a different subset of stale values in the partition, until at least one attempt has been made to refresh each stale value in the partition. The algorithm 600 may then be repeated to process one or more partitions. In one embodiment, the algorithm 600 repeats until all stale data in all partitions is replaced with fresh data.

Storing encrypted data on a centralized storage system, such as the crypto system 101 of the present disclosure has several benefits. One benefit of centralized storage is stronger access control and support for PCI DSS-compliant backups. Further, a single purge and archival policy may be established for all sensitive data. Another benefit is that a wide range of enterprise encryption needs may be supported by the server. That is, a crypto system 101 of the present disclosure is data agnostic and application-independent. In addition, different cryptography keys may be assigned to collections of applications with varying data rotation and archival policies. Finally, another benefit of a crypto system 101 of the present disclosure is that multiple encryption technologies may be simultaneously supported, including, without limitation, software and hardware based cryptography technologies.

The tokens described herein as part of the present disclosure also provide certain benefits. For example, the structure of a token generated by the crypto system 101 includes the last four characters of the encrypted data in unencrypted form. This feature is particularly useful when the encrypted data involves storing a credit card number. For example, in one embodiment, the token may include the last four digits of the encrypted credit card number in unencrypted form. In such an embodiment, the applications 120A-C do not need to submit a request to the crypto system 101 for unencrypted data if the applications 120A-C only need the last four digits of the credit card number. Also, a human operator would be able to read the last four digits of the credit card number simply by examining the token. Further, the ability to use application-defined tokens provides flexibility when using the applications 120A-C or application databases 130A-C are legacy systems that may not support the storage of a token defined by the crypto system 101.

Figure 7:
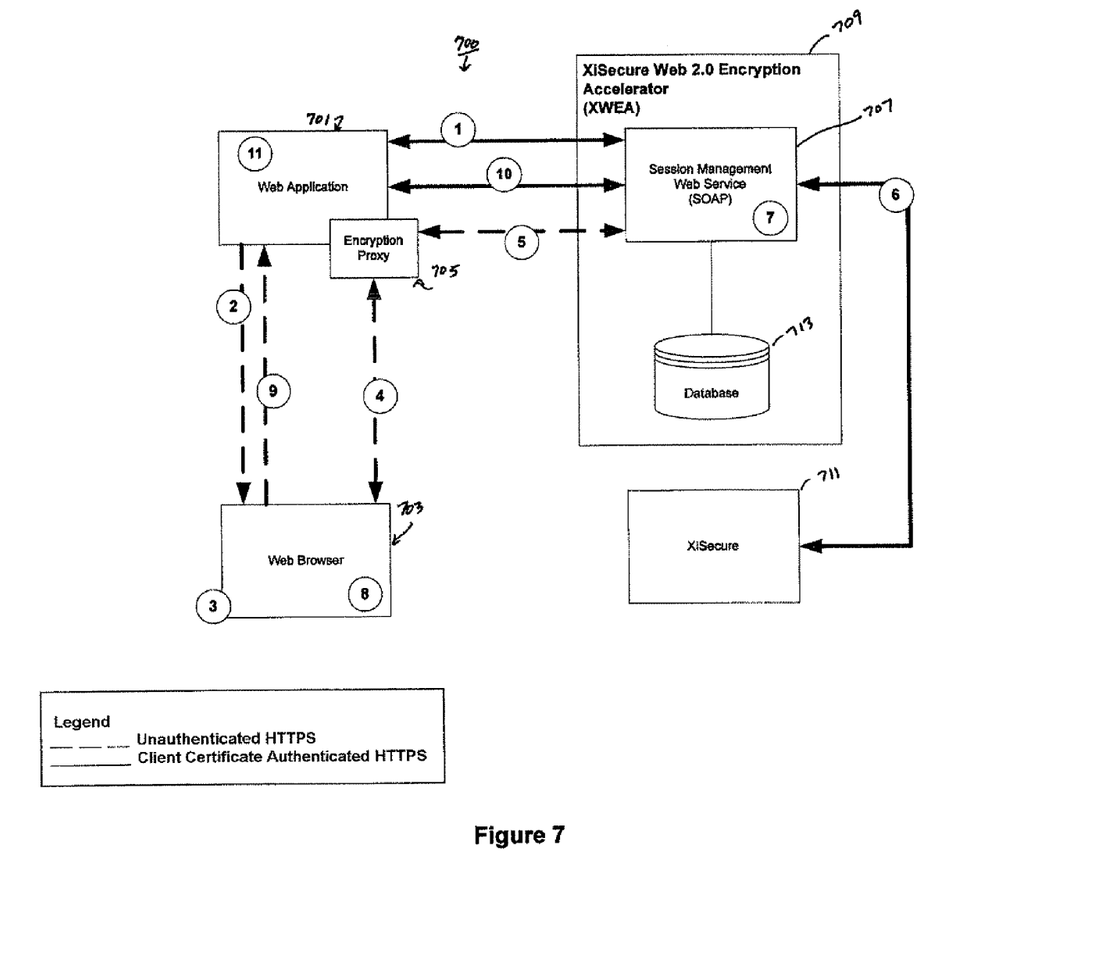
FIG. 7 illustrates a flowchart of an exemplary XWEA system and methodology of the invention.

FIG. 7 illustrates a flowchart of an exemplary XWEA system and methodology of the invention. The exemplary XWEA system 700 may generally include a Web Application 701, which is generally an application that generates a web-based front end GUI for the user. Various web commercially available web applications 701 may be used without departing from the scope of the invention, and further, the web application may be defined by the users of the exemplary XWEA 700. A Web Browser 703 is generally in communication with the web application 700, and is typically the program used on the web site visitor's computer to render the web application's, GUI. The web browser 703 may be any of the commercially available browsers, such as Firefox, Internet Explorer, Opera, Safari, or any other program configured to support web browsing.

An Encryption Proxy 705 is a translation layer between Ajax-type requests and the SOAP web service request for encryption. This is generally hosted on the same machine as the web application because most browsers enforce a sandbox type isolation when displaying web pages. Users can generally initiate commands interactively to cause the web browser to communicate with a remote server, but the sandbox isolation limits the communication such that communication is only allowed with the same machine that served the current page. This is the case with the Ajax XMLHttpRequest object, and is likely going to be the case with client-side display technologies such as Flash, Flex, Shockwave, Silverlight, etc. The inventors note, however, that a at least one exemplary embodiment of the present invention, a JavaScript API (not shown) used to communicate with the proxy will be written in JavaScript that will execute from inside the web browser. The implementation of the JavaScript API may be implemented so that it runs on versions of the most popular web browsers.

The exemplary XWEA system 700 may also include a Session Management Web Service 707, which is a key part in ensuring that the arbitrary generation of tokens is disallowed as well as validating that the input to the web application from the web browser is valid. The session management web service 707 may be in communication with a database 713. The XWEA 709, which for the present inventors is currently known under the product name "XiSecure," as the XWEA 709 may be incorporated into the XiSecure module 711, is the product that manages the centralization of encryption services and generates then tokens passed to the web application. Additionally, a JavaScript API may be on the client-side implementation of the encryption routines called by dynamically generated content from the web browser. Thus, a challenge of the present invention is to encrypt data with encrypt calls originating from a client-side web browser, and as such, the browser 703 will generally submit tokens to the application server rather than sensitive data. Tokens can be passed around enterprise systems and later decrypted when appropriate.

To implement this token passing process, generally speaking, a Web application 701 calls a SOAP web service 707 to obtain a subscription id for the tokenization session. This may be completed before the page is presented in the browser. One subscription id exists for each different data type to be encrypted, and the subscription id generally has a time-limited validity. The SOAP call may be authenticated using client certificates to identify the caller to the XiSecure Web 2.0 Encryption Accelerator 709.

Dynamic generation of Javascript function calls are set in fields to be tokenized where a Javascript function call is executed while passing the subscription id for the tokenization session. These function calls may be executed in the web browser 703 on the client side. The function implementations are contained in a provided Javascript API that is also included in the page by inserting <script> tags. The encryption is done with a simple XML form post type web service that responds with an XML stream. This is done to specifically support Ajax type encryption calls. Once the user has submitted the form data with fields containing tokens, the tokens are validated as tokens generated during the previously obtain subscription id. Once the tokens are validated, the subscription id is no longer valid. After a configurable time period, the subscription id is no longer valid. Any tokens that are submitted for validation but were not generated during the session described by the subscription id will cause the validation to fail.

Therefore, to implement the exemplary method, several components and capabilities may be required. For example, a Configurable subscription id timeout may be advantageously used. A configurable referrer URL (where only the server and directory name are matched) where tokenization calls are permitted to originate may be used, and one URL per origination point, one client certificate per origination point may be used. The ability to store client certificates/private key containers that are used for authenticating to the XiSecure web service is desirable for the implementation of the exemplary method, as the client certificate that identifies the calling application will map to the XiSecure client certificate. Additional items that may be beneficial to the implementation of the exemplary method may include a configurable maximum number of tokenization requests permitted per subscription id, a configurable maximum number of daily tokenization requests allowed from a single IP per day, and SNMP traps for invalid user authentication and exceeded max number of tokenization requests.

The exemplary method shown in FIG. 7 begins at step 1, where the Web application 701 generates a web page, and transmits the web page to the web browser 703 for display thereon. The web page may include form elements that request data that needs to be encrypted. Part of the initialization process may include retrieving a unique "subscription identifier" from the SOAP web service 707. The source application may identify itself to XWEA 709 with a client certificate that was configured previously in an administrative action during system configuration. The "subscription identifier" may be recorded as a subscription belonging to the XWEA client calling the web service. A subscription timeout may be recorded as part of the subscription. Once the initialization process is completed, the exemplary method continues to step 2, where the web application 701 may prepare the page for display to the caller's web browser 703. Part of the preparation may include a common XHTML tag that is included in the rendered output to include a Javascript API code file, such as "xwea.js". This file may contain the implementation that runs on the client side to communicate with the Encryption Web service. In appropriate places, the web application emits code that will cause methods in the Javascript API to be invoked by user-driven events (such as clicking a "submit payment" button or when exiting a text field where the credit card number is entered). The invocation of the elements may contain the unique "subscription identifier" as part of the parameter set to all API invocations.

Once the preparation process has been completed, the method may continue to step 3, where the web browser interacts with the web-application generated content. This may include entering payment information that is required in addition to the card number. As part of the user-interaction in the web browser, calls may be made to the Encryption proxy 705 to convert unencrypted data into a token. The Encryption proxy may be a simple form post with XML content. The Javascript API may implement the communication with the Encryption Proxy 705 via XMLHttpRequest. The encryption proxy 705 may then communicate with the Session Management web service 707 at step 5 to associate the unique subscription identifier with the XWEA client. The XWEA client may then be mapped to an XiSecure client certificate, and a call to XiSecure's pm_SingleEncrypt API may be made at step 6. Further, the association of an XWEA client certificate may be made through an administrative function during system configuration, and a single XWEA client certificate can be associated with only one XiSecure client certificate. However, a XiSecure client certificate may be associated with more than one XWEA client certificate. If the subscription identifier's timeout value (recorded in step 1) has been exceeded, the call to XiSecure 711 may be blocked by the session management web service. The XiSecure client certificate used will typically block all operations other than calls to pm_SingleEncrypt.

At step 7, the returned token may be recorded in association with the subscription identifier used to generate the token. The token is returned to the web browser and stored in the appropriate form field at step 8, and the user input form on the web browser is submitted back to the web application at step 9.

At this point in the exemplary method, the form's sensitive data fields now contain tokens generated by XiSecure 711 via a call to the Encryption Proxy 705, as described above in steps 4 and 5. Thus, the tokens submitted from the web form are validated with the session management web service 707 before the input data is processed by the web application 701 at step 10. The unique subscription identifier obtained is step 1 is passed as a parameter to the validation call, and if the XWEA client making the validation call is not associated with the subscription identifier, the validation may fail. Further, if the subscription identifier timeout (recorded in step 1) has expired, validation may fail. If a token that was not generated using the subscription identifier is passed in for validation, then the entire validation process may fail. It is valid to omit tokens generated with the subscription identifier, however, upon call to the validation routines, the subscription identifier is no longer valid for any operations. At step 11, the web application resumes processing, recording tokens instead of unencrypted data.

The manner of usage and operation of the present disclosure should be apparent to one of ordinary skill having the benefit of the present disclosure. The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The systems and methods disclosed and claimed herein can be made and executed without undue experimentation in light of the present disclosure. While the systems and methods of this invention have been described in terms of embodiments, it will be apparent to those of skill in the art that variations may be applied to the systems and in the steps or in the sequence of steps of the methods described herein without departing from the concept, spirit and scope of the invention. Further, since numerous modifications and changes will readily occur to those skilled in the art, it is not desired to limit the invention to the exact construction and operation shown and described, and accordingly, all such similar substitutes and modifications apparent to those skilled in the art are deemed to be within the scope and concept of the invention.

Although the present disclosure has described embodiments relating to specific networked enterprise environments, it is understood that the apparatus, systems and methods described herein could applied to other environments.

Any spatial references used herein, such as, "upper," "lower," "above," "below," "between," "vertical," "horizontal," "angular," "upward," "downward," "side-to-side," "left-to-right," "right-to-left," "top-to-bottom," "bottom-to-top," "left," "right," etc., are for the purpose of illustration only and do not limit the specific orientation or location of the structure described above. Additionally, in several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations. Finally, although the exemplary embodiments described above include an exemplary method, Applicants note that the sequence of steps recited in the above noted method are not intended to be limited to the particular sequence or order of steps recited in the exemplary method. Rather, the method of the invention is intended to include any combination of the steps described herein in any order, without limitation.

What is claimed is:

1. In a computer management encryption system comprising one or more hardware and software modules in communication with an encryption proxy, a method for protecting sensitive data, comprising the steps of:

receiving a request for a subscription identifier at the computer management encryption system from a web application, wherein the web application requests the subscription identifier based on anticipation of the receipt of sensitive data, and wherein the subscription identifier relates to a particular data type and a particular tokenization session;

generating via the computer management encryption system a unique subscription identifier for association with the web application and the particular tokenization session;

providing the unique subscription identifier from the computer management encryption system to the web application;

receiving sensitive data at the computer management encryption system from a web browser presenting the web application, via the encryption proxy, wherein the sensitive data comprises the particular data type and a plurality of data values, and wherein the sensitive data is associated with the unique subscription identifier;

generating via the computer management encryption system a token that is representative of the sensitive data in encrypted form, the token comprising a token format dependent on the particular data type of the sensitive data, and wherein the token format further comprises a plurality of token data values, wherein each token data value is dependent upon the data values in the sensitive data;

associating via the computer management encryption system the token with the sensitive data and the unique subscription identifier;

storing the token and the sensitive data and the unique subscription identifier in a database at the computer management encryption system; and providing the token from the computer management encryption system to the web browser presenting the web application for use in replacing the sensitive data with the token.

2. The method of claim 1, further comprising the steps of:
   receiving a client certificate from the web application at the computer management encryption system, wherein the certificate identifies the web application; and
   associating the unique subscription identifier with the client certificate at the computer management encryption system.

3. The method of claim 1, wherein the step of receiving sensitive data at the computer management encryption system includes validating the unique subscription identifier received from the web application, the method further comprising:
   performing the generating, associating, storing, and providing steps only if the unique subscription identifier is valid.

4. The method of claim 1, wherein the unique subscription identifier has a time-limited validity.

5. The method of claim 1, further comprising the steps of:
   associating, at the computer management encryption system, the unique subscription identifier with a tokenizer certificate;
   receiving the subscription identifier at the computer management encryption system from the web application;
   determining, at the computer management encryption system, whether the tokenizer certificate is valid; and
   performing the generating, associating, storing, and providing steps only if the tokenizer certificate is valid.

6. The method of claim 1, wherein the sensitive data is selected from the group comprising: credit card data, social security number data, employee-identification number.

7. The method of claim 1, wherein the token includes a portion of the sensitive data in unencrypted form.

8. The method of claim 1, further comprising the step of prior to generating the token, receiving from the web application a definition of an application-defined token format to be used by the computer management encryption system in connection with generating the token.

9. The method of claim 8, wherein the application-defined token format corresponds to a social security number.

10. The method of claim 8, wherein the application-defined token format corresponds to a credit card number.

11. The method of claim 8, wherein the application-defined token format corresponds to an employee-identification number.

12. The method of claim 1, wherein the web application includes a plurality of additional web applications communicably coupled to the web application and that share the token with the web application for purposes of utilizing the sensitive data.

* * * * *